ROELOF BOK,
INVENTOR.

ROELOF BOK,
INVENTOR.

April 7, 1970  R. BOK  3,504,607
MULTIPLE SHOT CAMERA
Filed Sept. 22, 1967  5 Sheets-Sheet 4

ROELOF BOK,
INVENTOR.

BY Wenderoth, Lind and
Ponack. Attorneys

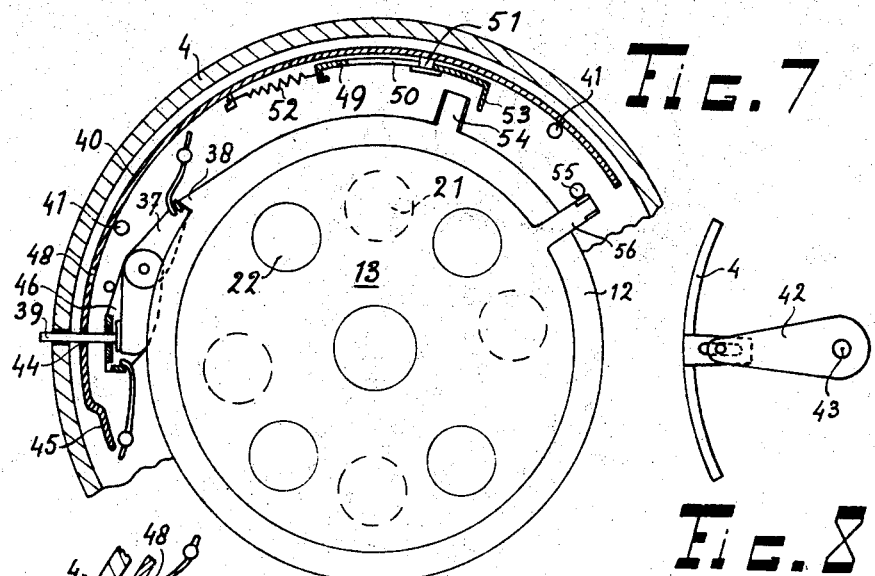
Fig. 7
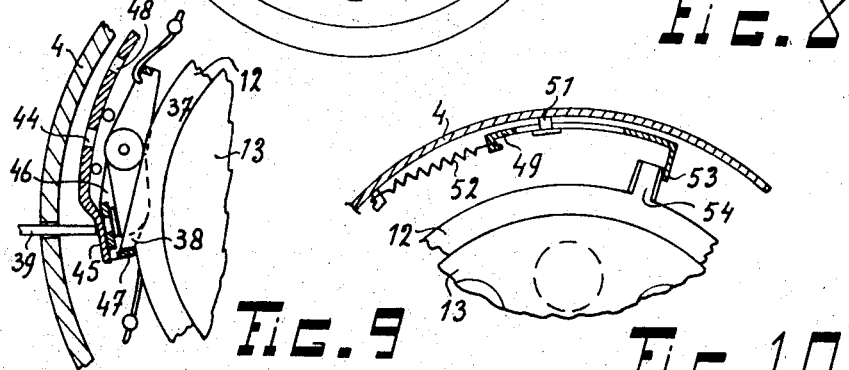
Fig. 8
Fig. 9
Fig. 10
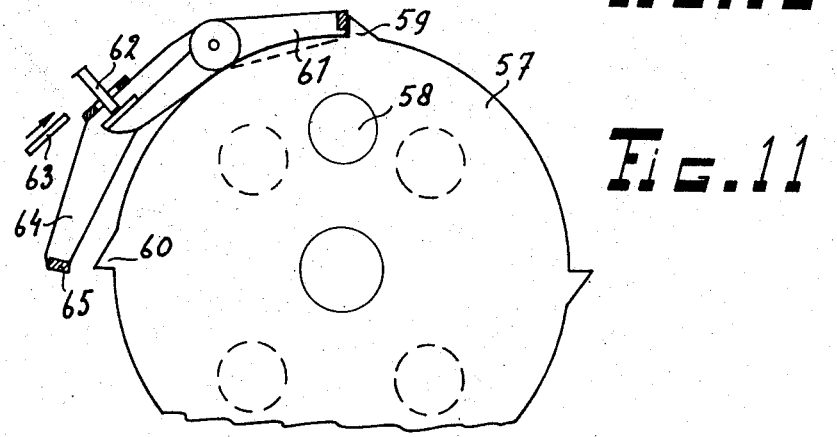
Fig. 11
ROELOF BOK
INVENTOR.
BY Wenderoth, Lind and
Ponack. Attorneys.

United States Patent Office 3,504,607
Patented Apr. 7, 1970

3,504,607
MULTIPLE SHOT CAMERA
Roelof Bok, Gildestrast 8, Kampen, Netherlands
Filed Sept. 22, 1967, Ser. No. 669,858
Claims priority, application Germany, Sept. 27, 1966,
B 67,962
Int. Cl. G03b 35/08
U.S. Cl. 95—18                                   5 Claims

ABSTRACT OF THE DISCLOSURE

A photographic camera with a plurality of objective lenses for making a number of identical photographs. The objective lenses have a common diaphragm and shutter. The diaphragm and shutter consists of apertured discs which are rotatable about a central axis. The apertured discs have a circular central area and two side jobes. By rotating the disc the amount of light falling on the objective lenses is adjustably controllable. A selectively spring pawl operates the shutter to either take a single or multiple photograph.

---

The invention relates to a photographic camera provided with a plurality of objective lenses, more particularly four, which have their optical axes mutually parallel, so as to permit a corresponding number of exposures of one and the same object to be made on a light-sensitive sheet of film. Multiple shot cameras of that type offer considerable advantages, e.g. in cases where a moderate number of identical or virtually identical pictures of a person are required as for passports, identity cards etc., especially if a self-developing film of the Polaroid-Land type is used.

In one prior art multiple shot camera of this kind each of the objective lenses has its own iris diaphragm of conventional construction and the setting rings of these diaphragms are mechanically coupled to ensure that the lenses are at all times stopped down to the same aperture. This construction tends to make the camera relatively complicated and expensive.

In the same prior art camera the four lenses have a common rotating disc shutter provided with four holes, i.e. one for each lens. The simplification thus gained implies, however, that the four pictures can only be made simultaneously, if no special measures are taken. If one desires to make four single pictures instead of one multiple exposure, separate lens caps have to be placed on the three lenses which are not used at a time.

Accordingly, it is an object of my present invention to provide a multiple shot camera which is simpler in construction and handling than the cameras available heretofore. It is a further object to provide a multiple shot camera having a common diaphragm of simple construction for all the camera lenses. It is a still further object to devise a common shutter construction for the multiple shot camera which permits both the simultaneous or virtually simultaneous exposure of all the picture frames, and the single exposure of a selected frame, at the choice of the operator.

To achieve these objects, I provided a common disc diaphragm as well as a common disc shutter for the objective lenses, the discs of both the diaphragm and the shutter being all rotatable about a central camera axis which is parallel to the optical axes of the objective lenses. Suitably, the disc diaphragm comprises two discs mounted closely adjacent one another and being rotatably adjustable in mutually opposite directions, said discs having apertures which in number and position correspond to the camera lenses and whose shape is such that the mutually opposite rotations of the discs result in variations of the effective lens apertures. In a preferred embodiment these disc apertures comprise a circular central area whose diameter corresponds to the maximum lens aperture, and two further substantially semi-circular areas on either side of the central area and of different diameters which are both smaller than the diameter of the central area. If the discs are in their middle positions the large central areas of the disc apertures are in alignment with their relative lenses thus providing the maximum lens aperture. When turned a given angle in either direction each disc will obstruct the central areas of the apertures in the other disc but, for each lens, one of the semi-circular areas of one disc will define jointly with the like semi-circular area of the other disc a smaller lens aperture.

As a suitable means for rotatably actuating the diaphragm discs a two-armed setting lever may be provided which is journalled eccentrically relative to the discs and whose two arms of unequal lengths each slidingly engage one of the diaphragm discs.

In one embodiment of the invention the disc shutter may have three discs. The first and second thereof have apertures equal in number to and in like configuration as the objective lenses. The first shutter disc is operatively connected to shutter driving means which, when tripped, turn the disc a predetermintd angle so that each exposure aperture passes the light beam of a relative objective lens. The second shutter disc is a capping disc whose apertures normally are aligned with the objective lenses, but which covers the lens apertures temporarily when the firs disc is reset after an exposure. The third disc is, in effect, a frame selector. Contrary to the first and second discs, it has one aperture in excess of the number of obpective lenses and can be selectively brought into a corresponding number of different positions. In one position the light beams of all the objective lenses are uncovered simultaneously whereas, in each of the remaining positions, only the beam of a selected objective lens is uncovered and all of the other lenses are capped.

The invention will now be explained in greater detail with reference to the drawings in which:

FIG. 7 is a front view, partially cross-section of the disc shutter;

FIGS. 8 to 10 show details of the shutter mechanism; and

FIG. 11 is a front view of a different type of disc shutter.

Figure 1:
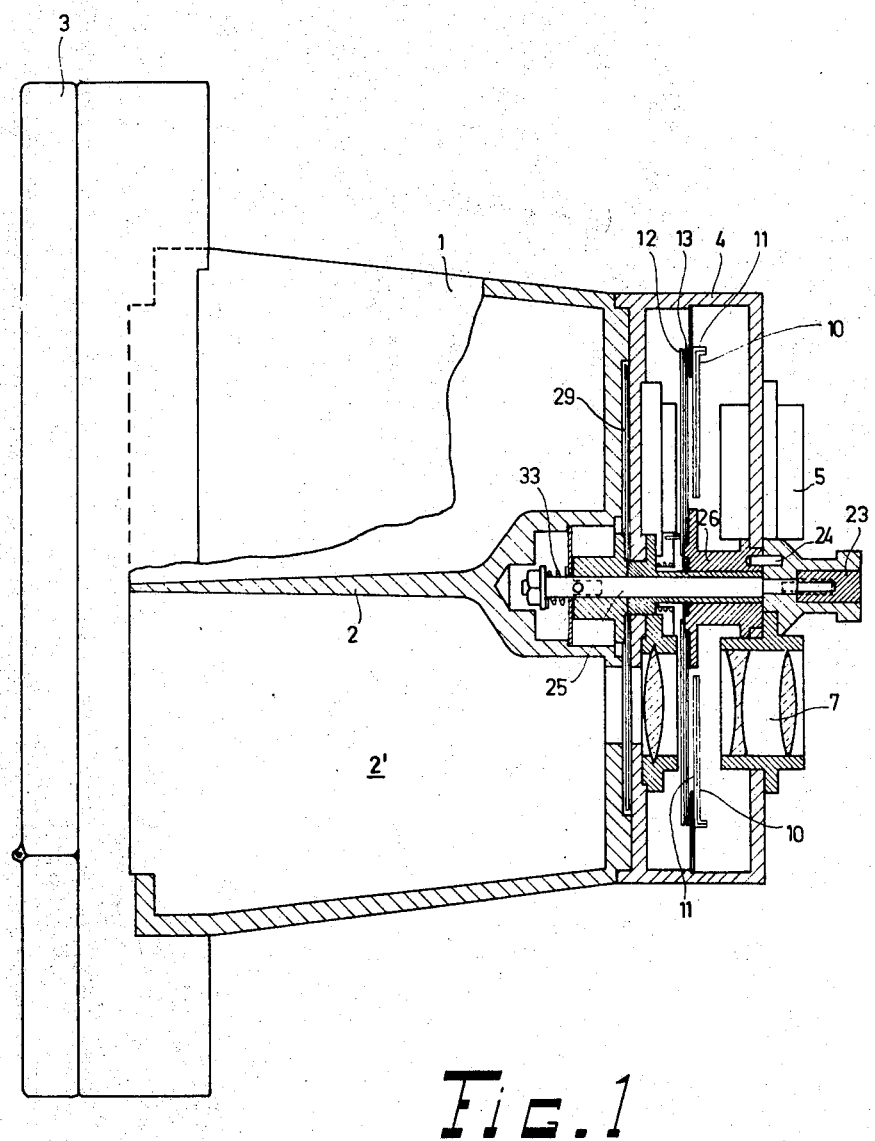
FIG. 1 shows a four lens multiple shot camera in cross-section along the broken plane I—I in FIG. 2.
Figure 2:
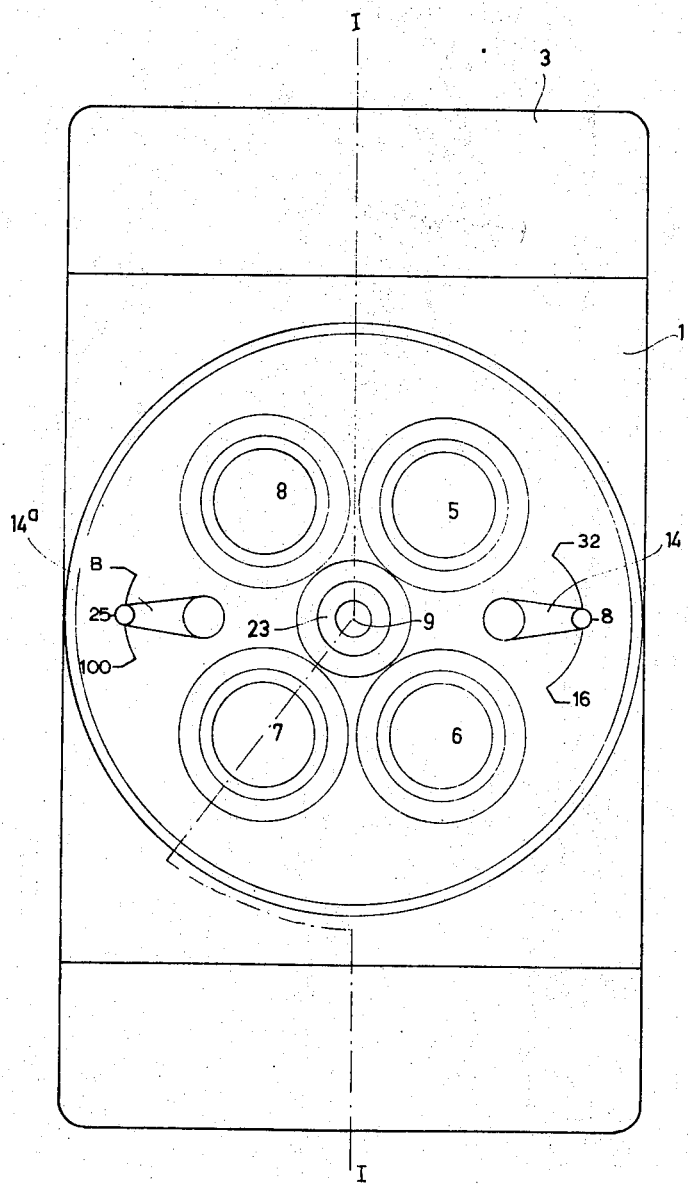
FIG. 2 shows a front view of the same camera.

The camera of FIGS. 1 and 2 has a camera body 1 whose interior is divided into four compartments by two crossed partitions, 2, 2'. To the back of the camera body a film cassette 3 is attached while a cylindrical front part 4 houses four objective lenses 5, 6, 7, 8 and the accessory mechanisms, such as the shutter and diaphragm. As the picture format is not square, the objective lenses are not mounted in a quadrangle. Their optical axes have the same distance to the central camera axis 9; however, the objectives are triplets and have the diaphragm air space between the second and the third lens. In these air spaces the common diaphragm made up of the discs 10 and 11, as well as the first two discs 12 and 13 of the common disc shutter have been provided. All of the discs 10 to 13 are rotatable about the central camera axis 9.

Figures 3, 4:
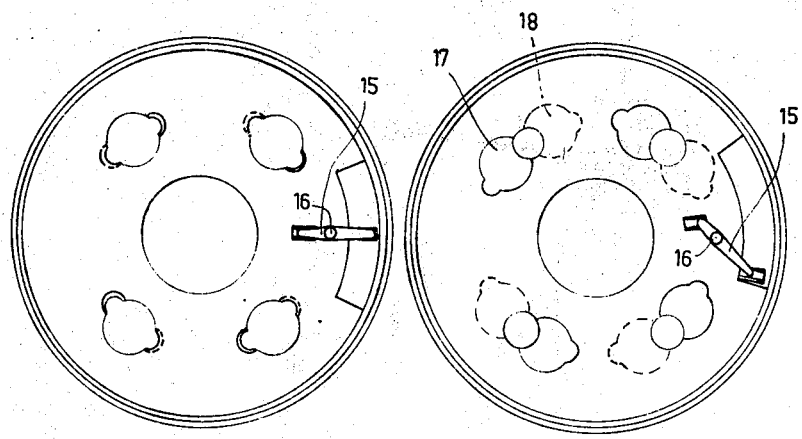
FIGS. 3 to 5 illustrate the operation of the disc diaphragm.
Figure 5:
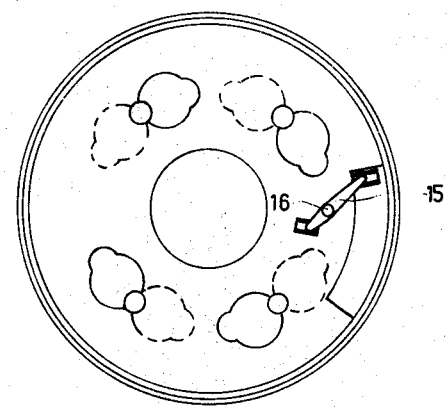

The diaphragm discs 10 and 11 are rotatably adjustable from the front side of the camera by means of a setting lever 14 (FIG. 2). As seen in FIGS 3 to 5 that lever is connected through an axle 16 to a two-armed lever 15 in the interior of the front part 4. The arms of lever 15 have hooked ends extending into radial slits of the discs so as to slidably engage the latter. When the setting lever 14 is turned from the middle position into the upper or lower position the diaphragm discs 10 and 11 are rotated in opposite directions through equal angles. Each of the diaphragm discs is provided with four apertures like 17 and 18 of a special shape, i.e. each is made up of a relatively large circular central area and two approximately semi-circular smaller areas or side lobes, one on either side of the central area, which have their centers the same radial distance from the camera axis 9 as the central areas. These side lobes have different diameters, the lobes with the smaller diameter of one disc being on the opposite side of the central area compared with the corresponding lobes of the other disc. FIGS. 3 to 5 clearly illustrate the manner in which this form of aperture permits three different light passages to be formed by changing the positions of the diaphragm discs relative to the lens axes. In FIG. 3 the lenses are opened to the maximum relative aperture of $f/8$. In FIG. 4 the diaphragm has been set for an intermediate aperture $f/16$ by turning the lever 14 clockwise, whereas in FIG. 5 the smallest aperture $f/32$ has been obtained by turning lever 14 counter-clockwise. In each case the apertures defined by the diaphragm are perfectly centered on the lens axes, as is desirable in view of the image quality. It may be observed that for the type of work envisaged these three lens stops may suffice under virtually all conditions.

Figure 6:
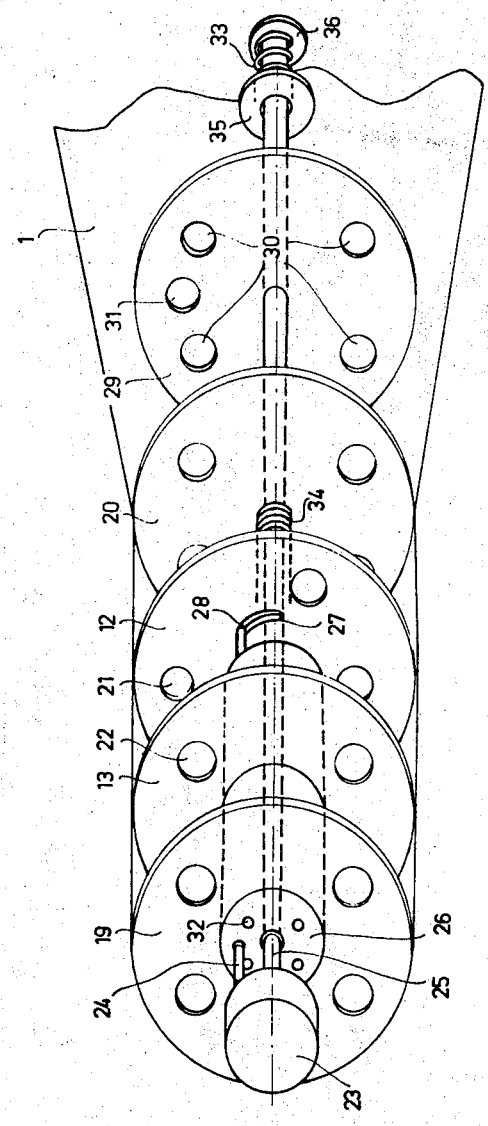
FIG. 6 shows the disc shutter diagrammatically to explain its function.

Now referring to FIG. 6, the numerals 19 and 20 designate the front and rear walls, respectively, of the cylindrical front part 4 of the camera. Between them are the two shutter discs 12 and 13 which have four apertures such as 21 and 22 each. Disc 12 performs the exposure proper. To that end it rotates counter-clockwise through an angle slightly less than 90° under the action of a driving spring 34 whereby its apertures move past the lens apertures. Coil spring 34 is placed around axle 25 and has its ends attached to the partition 20 and the disc 12, respectively. Disc 13 is a capping disc which should prevent false exposures when the shutter is rewound. Thus, normally the apertures 22 will be in alignment with the objective lenses but during the winding motion disc 13 is temporarily coupled with the disc 12 so as to cover the exposure apertures 21.

The shutter assembly is shown in FIG. 6 as ready for exposure. In this position disc 12 is locked by a pawl with spring 34 tensioned. When the shutter is tripped spring 34 urges disc 12 to turn counter-clockwise and the exposure is made. This motion is stopped when the end of an arcuate slot 27 meets a pin 28 which projects from the back face of a hub 26 and extends into the slot 27. To rewind the shutter a knob 23 on the front plate of the camera which is screwed on the axle 25 is turned clockwise. The hub 26 and the capping disc 13 which is fixed thereon follow this rotation because of the pin 24 which is received by one of the five holes like 32 provided in the front face of the hub 26. Through the pin 28 the exposure disc 12 follows the rotation likewise, thereby tensioning the driving spring 34. Towards the end of the rewinding stroke disc 12 will become locked again in a manner to be explained with reference to FIG. 7. The axle 25, on the contrary, is urged back to its original position by a coil spring 33 which is wound with a certain pre-stress around the free end of the axle 25. The ends of the spring are fastened to two ring-shaped supports of which one, 35, is fixed to the camera body while the other, 36, is solidary with the axle 25. Jointly with axle 25, hub 26 and capping disc 13 also return to their normal position which, as shown in FIG. 7, is determined by an abutment 55 which is located in the path of a peripheral notch 56 of disc 13.

In FIG. 7 a spring-loaded pawl 37 is seen whose nose snaps behind a peripheral notch 38 of disc 12 at the time the rewinding motion is completed. The figure shows the various elements as ready for exposure, disc 13 being in its normal position. To trip the shutter, pawl 37 is lifted, e.g. by pressing a wire release whose core wire 39 is inserted through a hole in the camera wall.

FIG. 7 and the associated FIGS. 8 to 10 also show details of the means used to vary the exposure time. The shutter time is selected by means of a lever 14a on the camera front plate (see FIG. 2) which has positions for exposures of $\frac{1}{25}$ and $\frac{1}{100}$ of a second, and for time exposures (B). Fastened to the same axle 43 as lever 14a is a lever 42 in the interior of the camera front part 4. As seen in FIG. 8 this lever is slidingly connected with a long arcuate strip 40 which extends along the wall of part 4 and is held in place by small pins 41. Under the action of lever 42 strip 40 may be shifted lengthwise, the position shown in FIG. 7 being that for an exposure of $\frac{1}{25}$ of a second. In this middle position a hole 44 in the strip 40 permits the tripping wire 39 to reach the pawl 37 to initiate the exposure as described hereinbefore.

In the position B of lever 14a the strip 40 has been shifted clockwise to such an extent that its left hand end portion 45 is inserted between the tripping wire 39 and the pawl 37, as seen in FIG. 9. In this portion 45 there is no hole in the strip for the wire 39. Swingable about the same axle as the pawl 37 there is provided a second spring-loaded pawl 46. Normally, this pawl will not interfere with the action of wire 39 on the pawl 37 since it is provided with a hole leaving passage to the wire. However, now that the end portion 45 of strip 40 covers the hole, tripping wire 39 can not engage pawl 38 directly. Thus, if the wire release is pressed with the shutter cocked, the resilient strip 40 will slightly bend, urging pawl 46 to insert its hooked nose 47 into the path of the notch 38 on shutter disc 12 shortly before pawl 37 is lifted. The position of nose 47 is such that disc 12 will be stopped exacly when the exposure apertures 21 have become aligned with the camera objectives. This situation will last as long as the wire release is held pressed by the operator. When wire 39 is retracted, however, pawl 46 is lifted and disc 12 is allowed to complete its movement.

When turned to the position for $\frac{1}{100}$ of a second, lever 42 shifts the strip 40 counter-clockwise, thus that a second hole 48 in the strip 40 gives passage to the release wire 39. Therefore, in this case pawl 46 will not stop the disc 12 half-way, once that the pawl 37 has tripped the same. However, jointly with the strip 40 a second shorter strip 49 has been shifted. Strip 49 extends parallel to the strip 40 and is slidably attached thereto by means of a slit 50 receiving a pin 51 which is fastened to strip 40. Normally, strip 49 is urged to its utter left position relative to strip 40 by a draw-spring 52 whose ends are fastened to hooks on the strips 40, 49. The free end of strip 49 is bent to a hook 53 extending into the way of a peripheral notch 54 of disc 12. As long as the strip 40 is in the position of FIG. 7 notch 54 will never reach the hook 53. If, on the contrary, strip 40 has been shifted to the left to set the shutter for $\frac{1}{100}$, as shown in FIG. 10, the notch 54 will engage hook 53 and push strip 49 to the right during the last phase of the winding movement, thereby tensioning the spring 52. Accordingly, when the shutter is tripped the additional force of this spring 52 is available to achieve the higher rate of rotation which is now required.

Now referring again to FIG. 6, behind the partition 20 a third shutter disc 29 is fixedly mounted on the axle 25. This disc may be termed the frame selector and has, in addition to the four apertures 30, a fifth aperture 31. With the axle 25 in the position shown, the apertures 30 are in alignment with the camera objectives. By means of the knob 23 on the camera front plate the axle 25 can be retracted against the force of the spring 33 so far as to lift the pin 24 out of the hole in the front face of hook 26 it was in. Then, knob 23 may be turned and pin 24 inserted into one of the remaining holes 32. The configuration of the holes 32 corresponds with that of the apertures 30, 31 in the selector disc 29. It will be evident, that in this manner the position of the apertures in disc 29 relative to the objective lenses can be changed at will, such that either the four apertures 30 are aligned with the four lenses, or the aperture 31 uncovers a selected one of the four lenses while the remaining three lenses are capped by the disc 29. This selection procedure interferes in no way with the operations of the discs 12 and 13 and the associated mechanisms described above.

In FIG. 11 the exposure disc 57 of a somewhat different type of shutter is shown. This shutter may be a two disc shutter which has, in addition to the exposure disc a capping disc constructed and functioning in much the same way as the capping disc 13 of the shutter previously described. The difference is that the shutter of FIG. 11 is arranged to make a full revolution for each multiple exposure. Consequently, it is sufficient to provide the exposure disc with one aperture 58 only since this will sweep each of the lenses during the revolution. Of course, in this case the four shots will not be made exactly at the same time, but since the revolution will be completed within a small fraction of a second, for most purposes the pictures may be considered as identical.

It will be evident that this shutter too could be provided with a frame selector disc as described in connection with FIG. 6. However, as a more convenient way to provide for separate single exposures, disc 57 in FIG. 11 can be so arranged that its complete revolution is divided into four steps, each involving a rotation through about 90°. Suitable means to achieve this action have been shown in FIG. 11.

The exposure disc 57 is provided with four peripheral notches as 59, 60 spaced apart by 90°. Disc 57 is shown in cocked position, its driving spring (not shown) having been fully wound by turning disc 57 clockwise through one complete revolution, and spring-loaded lever 61 having placed its nose behind the notch 59. To make a multiple exposure pawl 61 is lifted by means of the wire release 62, thus permitting disc 57 to make a full revolution, whereby the four lens apertures shown in dotted lines are swept by the sole disc aperture 58. If it is desired to make a single picture, a strip 63 is shifted in the direction of the arrow to be inserted under the tripping wire 62. In this position strip 63 covers a hole in a lip of second spring-loaded pawl 64 so that wire 62 can no longer contact the pawl 61 directly. Consequently, when the wire release 62 is pressed, it first urges pawl 64 to place its nose 65 into the path of the notch 59 of disc 57 and only thereafter lifts the pawl 61. Thus, disc 57 is stopped after nearly a quarter revolution by nose 65. When wire 62 is now retracted pawl 61 will first place its nose behind the next notch of disc 57 before pawl 64 is lifted, so that the disc will only rotate through a very small angle and is prepared for the next exposure. In exactly the same way as described the next three pictures may be made. Alternatively, if the strip 63 is shifted back the remaining pictures may all be made at once by operating the wire release.

It will be understood that the examples shown and described may be modified in various ways without leaving the doman of the invention. For instance, a capping disc may be omitted from the shutter if the arrangement is made such that the driving spring can be rewound in forward direction, i.e. without moving back the exposure disc to its original position. This and other modifications will readily suggest themselves to the reader and need not be discussed in detail.

What I claim is:

1. A photographic camera comprising a plurality of objective lenses having their optical axes mutually parallel, a disc shutter common to and permitting substantially simultaneous exposures to be made through all said lenses, said shutter including at least one aperture disc positioned in the light path behind said lenses and rotatable about a central camera axis parallel to and at equal distances from said optical axes to effectuate said simultaneous exposures, a diaphragm common to all said lenses and positioned in the light paths therebehind, said diaphragm comprising two discs mounted closely adjacent one another rotatably adjustable in mutually opposite directions about said central camera axis, and having apertures equal in number and configuration to said lenses, said diaphragm apertures having a radial width varying in a direction tangential to said central camera axis whereby opposite rotation adjustments of said diaphragm discs result in simultaneous variations of the effective lens aperture of all said lenses.

2. A camera as set forth in claim 1, wherein said diaphragm apertures comprise a circular central area of a diameter corresponding to the maximum lens aperture, and two further substantially semi-circular areas on either side of said central area and of different diameters smaller than the diameter of said central area, said semi-circular areas having their centers at the same radial distance from said central camera axis.

3. A camera as set forth in claim 1 wherein a diaphragm setting lever having two arms is journalled eccentrically relative to said diaphragm discs, said arms being of unequal length and each being in slidable engagement with one of said diaphragm discs to effectuate said mutually opposite rotations of said diaphragm discs.

4. A photographic camera, comprising a plurality of objective lenses having their optical axes mutually parallel, a disc shutter common to and permitting substantially simultaneous exposures to be made through all said lenses, said shutter comprising three apertured discs positioned in the light paths behind said lenses and rotatable about a central camera axis parallel to and at equal distances from said optical axes, a first of said shutter discs having at least one aperture and being operatively connected to a shutter driving means adapted to cause said first shutter disc to rotate and thereby sweep said aperture past said lenses, a second of said shutter discs having a number of apertures exceeding the number of lenses by one and being adapted to be selectively brought into a corresponding number of positions, whereby in one of said positions the lenses are simultaneously uncovered by corresponding apertures of said second shutter disc, and in each of the remaining positions a selected one of the lenses only is uncovered by the remaining aperture of said second shutter disc, while the other lenses are capped by said second shutter disc, a third of said shutter discs having apertures equal in number to and of the same configuration as the lenses, said third disc being operatively connected with said first shutter disc so that during an exposure the apertures of said third shutter disc are in alignment with the lenses, while during rewinding of the shutter which involves a rotation of said first shutter disc in the direction opposite to its rotation during exposure, said third shutter disc is made to rotate in unison with said first shutter disc and to cap thereby the apertures in said first shutter disc, and a disc diaphragm likewise common to all said lenses and positioned in the light paths therebehind, said diaphragm comprising at least one apertured disc rotatably adjustable about said central camera axis to thereby simultaneously vary the effective lens apertures of all said lenses.

5. A photographic camera, comprising a plurality of objective lenses having their optical axis mutually parallel, a disc shutter common to and permitting substantially simultaneous exposures to be made through all said lenses, said shutter comprising an exposure disc positioned in the light paths behind said lenses and rotatable about a central camera axis parallel to and at equal distances from said optical axes, said exposure disc having a sole aperture and being operatively connected to a shutter driving means adapted to cause said exposure disc to rotate to thereby sweep said aperture past said lenses, a selectively spring pawl operates to stop the rotation of said exposure disc after exposure of one single lens, and a diaphragm likewise common to all said lenses, said diaphragm comprising at least one apertured disc rotatably adjustable about said central camera axis to thereby simultaneously vary the effective lens apertures of all said lenses.

References Cited

UNITED STATES PATENTS

| | | | |
|---|---|---|---|
| 2,966,102 | 12/1960 | Whittier | 95—59 XR |
| 3,128,685 | 4/1964 | Kitrosser | 95—18 |
| 3,270,646 | 9/1966 | Wilson | 95—61 XR |
| 3,323,432 | 6/1967 | Robanit | 95—58 XR |
| 3,429,247 | 2/1969 | Rice | 95—61 |

NORTON ANSHER, Primary Examiner

L. H. McCORMICK, JR., Assistant Examiner

U.S. Cl. X.R.

95—36, 61, 64